July 7, 1936.  W. M. KIEFFER  2,046,916
CLUTCH COLLAR
Filed April 16, 1934  2 Sheets-Sheet 1

Inventor
W. M. Kieffer
By Clarence A. O'Brien
Attorney

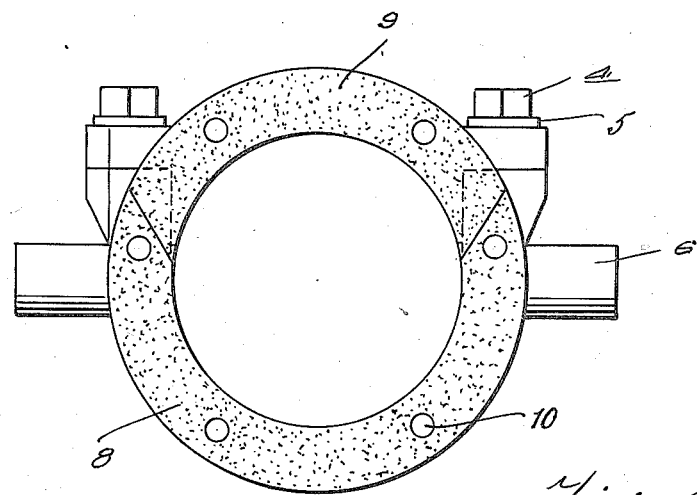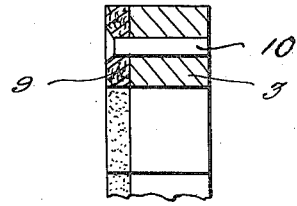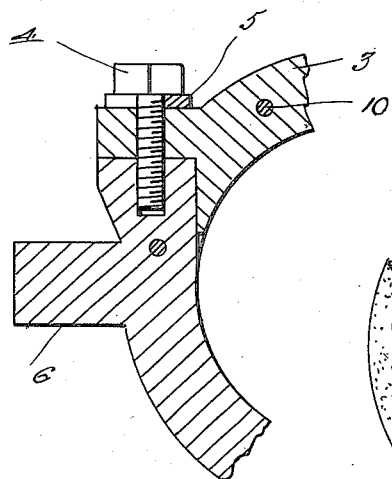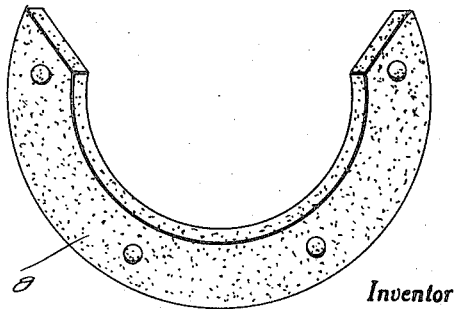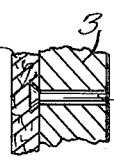

Patented July 7, 1936

2,046,916

UNITED STATES PATENT OFFICE 2,046,916

CLUTCH COLLAR

Walter M. Kieffer, Fleetwood, Pa.

Application April 16, 1934, Serial No. 720,851

1 Claim. (Cl. 192—98)

The present invention relates to new and useful improvements in clutch collars for operating the movable clutch element of clutches used in looms of various types or makes, particularly Jacquard looms, and has for its primary object to provide, in a manner as hereinafter set forth, a clutch collar of this character embodying a novel construction, combination and arrangement of parts whereby wear on said collar, on the friction pulley of the loom which the collar is arranged to engage for retracting the clutch element, will be materially reduced or substantially eliminated, thus greatly prolonging the life of the friction pulley in addition to providing a clutch collar of comparatively long life.

Other objects of the invention are to provide a loom clutch collar which will be simple in construction, compact, reliable and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 3 is a front elevational view.

Figure 5 is a fragmentary view in vertical section, showing the means for connecting the sections of the clutch collar together.

Figure 6 is a detail view in section through a portion of the invention.

Figure 7 is a detail view in perspective of one of the facing sections.

Figure 9 is a sectional view similar to Figure 6 but showing another embodiment of the invention wherein the holding means has its head embedded instead of flush or exposed at the surface of the material.

Figure 1:
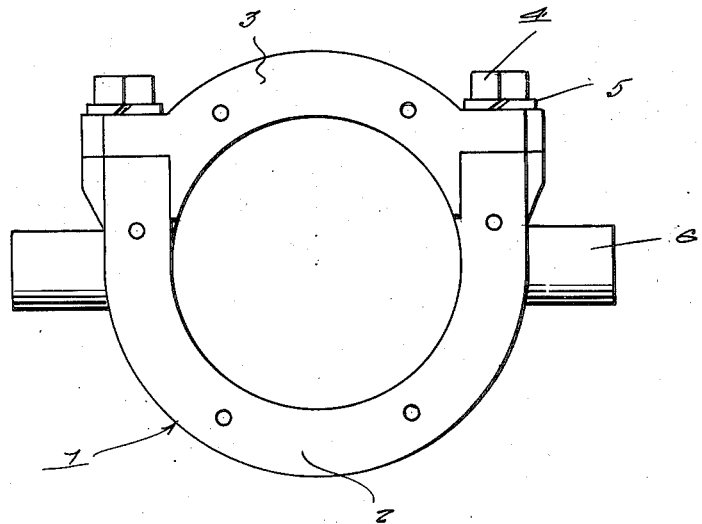
Figure 1 is a view in rear elevation of a loom clutch collar constructed in accordance with the present invention.
Figure 4:
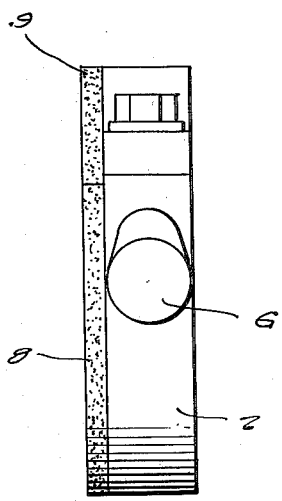
Figure 4 is a view in side elevation of the clutch collar.
Figure 2:
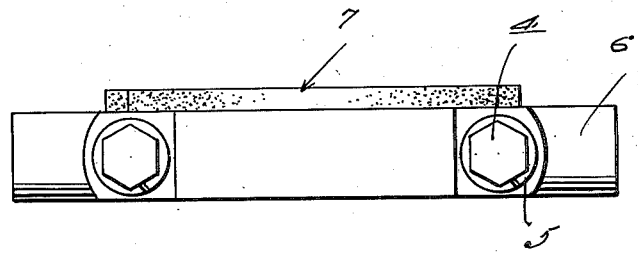
Figure 2 is a view in top plan thereof.
Figure 8:
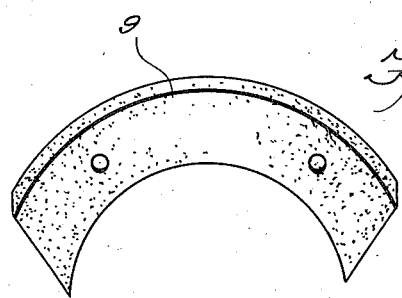
Figure 8 is a detail view in perspective of the other facing section.

Referring now to the drawings in detail, it will be seen that the embodiment of the invention which has been illustrated comprises an annulus which is designated generally by the reference numeral 1, said annulus including a pair of complemental sections 2 and 3 which are detachably secured together by cap screws 4.

Lock washers 5 are provided for the cap screws 4. The reference numeral 6 designates trunnions which project laterally from the section 2 of the annulus 1.

The face of the annulus 1 which is adjacent the friction pulley of the loom has secured thereon in any suitable manner a fibrous material facing which is designated generally by the reference numeral 7. The facing 7 includes sections 8 and 9 which are mounted on the sections 2 and 3, respectively, of the annulus 1. The reference numeral 10 designates elements which secure the facing 7 on the annulus 1. However, any other suitable means may be utilized for accomplishing this. For example, pins may project from the annulus 1 in a manner to be embedded in the facing 7 thus preventing any metal from coming in contact with the friction pulley of the loom as illustrated in Figure 9.

As is believed to be apparent, the clutch collar may be expeditiously mounted on the loom by simply removing the section 3 from the section 2 of the annulus 1. By providing a clutch collar which is substantially in the form of an annulus instead of a yoke such as are in widespread use at present, an even pressure will be exerted against the friction pulley of the loom.

It is believed that the many advantages of a loom clutch collar constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A device of the character described comprising a substantially U-shaped member each leg of which has an outwardly extending journal boss, the bosses being axially aligned, extending in opposite directions, and located below the upper ends of said legs, said upper ends of the legs being thickened and having substantially flat tops, a segmental member formed at each end with a V-shaped notch, one side of said notch engaging the flat top of the corresponding leg and the remaining side of said notch engaging the inner surface of the upper end of the corresponding leg, bolts traversing the ends of said segmental member and passing through the said one side of the corresponding notches and engaging the upper ends of said legs so as to fasten said segmental member to the upper ends of said legs, the radially inward surfaces of said U-shaped member and of said segmental member being curved and concentric, and a flat friction material ring attached to one side of said device, said ring being formed of a U-shaped part on said U-shaped member and a segmental part on said segmental member.

WALTER M. KIEFFER.